US 8,370,470 B2

(12) United States Patent
Kim et al.

(10) Patent No.: US 8,370,470 B2
(45) Date of Patent: *Feb. 5, 2013

(54) SYSTEM AND METHOD FOR MANAGING SERVER CONFIGURATIONS

(75) Inventors: Steven D. Kim, Agoura Hills, CA (US); Lior Elazary, Agoura, CA (US)

(73) Assignee: Web.com Holding Company, Inc., Jacksonville, FL (US)

(*) Notice: Subject to any disclaimer, the term of this patent is extended or adjusted under 35 U.S.C. 154(b) by 2798 days.

This patent is subject to a terminal disclaimer.

(21) Appl. No.: 09/766,473

(22) Filed: Jan. 19, 2001

(65) Prior Publication Data

US 2002/0069272 A1 Jun. 6, 2002

Related U.S. Application Data

(63) Continuation of application No. 09/565,270, filed on May 5, 2000, now Pat. No. 6,842,769.

(51) Int. Cl.
*G06F 15/173* (2006.01)
(52) U.S. Cl. ....................................................... 709/223
(58) Field of Classification Search .......... 709/220–223; 707/8–10
See application file for complete search history.

(56) References Cited

U.S. PATENT DOCUMENTS

| | | | |
|---|---|---|---|
| 5,553,239 A | 9/1996 | Heath et al. | |
| 5,652,908 A | 7/1997 | Douglas et al. | |
| 5,734,831 A | 3/1998 | Sanders | |
| 5,758,071 A | 5/1998 | Burgess et al. | |
| 5,758,355 A * | 5/1998 | Buchanan | 707/201 |
| 5,819,030 A | 10/1998 | Chen et al. | |
| 5,845,077 A | 12/1998 | Fawcett | |
| 5,857,102 A | 1/1999 | McChesney et al. | |
| 5,862,339 A | 1/1999 | Bonnaure et al. | |
| 5,870,557 A | 2/1999 | Bellovin et al. | |
| 5,961,598 A | 10/1999 | Sime | |
| 5,999,947 A * | 12/1999 | Zollinger et al. | 707/203 |
| 6,012,088 A | 1/2000 | Li et al. | |
| 6,026,440 A | 2/2000 | Shrader et al. | |
| 6,047,129 A | 4/2000 | Frye | |
| 6,052,449 A | 4/2000 | Chavez | |
| 6,073,172 A | 6/2000 | Frailong et al. | |
| 6,076,106 A | 6/2000 | Hamner et al. | |
| 6,076,113 A | 6/2000 | Ramanathan et al. | |
| 6,085,171 A | 7/2000 | Leonard | |
| 6,085,241 A | 7/2000 | Otis | |
| 6,098,098 A | 8/2000 | Sandahl et al. | |

(Continued)

FOREIGN PATENT DOCUMENTS

| EP | 1064755 | 9/1999 |
|---|---|---|
| EP | 0989501 | 3/2000 |

(Continued)

OTHER PUBLICATIONS

Co-pending application entitled "Third Party Management of Computer System Control," inventor, Steven D. Kim, U.S. Appl. No. 09/620,799, filed Jul. 21, 2000.

(Continued)

*Primary Examiner* — John Macilwinen
*Assistant Examiner* — Benjamin Ailes
(74) *Attorney, Agent, or Firm* — Thomas | Horstemeyer, LLP

(57) ABSTRACT

A computer system comprises servers running application programs which are controlled, at least in part, by configuration parameters. The parameters are updated by first updating a database of configuration parameters, and then automatically updating the servers in accordance with the database updates to automatically maintain synchronization between the server configuration and the database.

22 Claims, 11 Drawing Sheets

U.S. PATENT DOCUMENTS

| | | | |
|---|---|---|---|
| 6,125,390 A | 9/2000 | Touboul | |
| 6,145,002 A | 11/2000 | Srinivasan | |
| 6,167,408 A | 12/2000 | Cannon et al. | |
| 6,175,869 B1 | 1/2001 | Ahuja et al. | |
| 6,195,689 B1 | 2/2001 | Bahlmann | |
| 6,205,477 B1 | 3/2001 | Johnson et al. | |
| 6,212,585 B1 | 4/2001 | Chrabaszcz | |
| 6,243,754 B1 | 6/2001 | Guerin et al. | |
| 6,243,761 B1 | 6/2001 | Mogul et al. | |
| 6,263,361 B1 | 7/2001 | Hoyer et al. | |
| 6,286,038 B1 | 9/2001 | Reichmeyer et al. | |
| 6,298,356 B1 | 10/2001 | Jawahar et al. | |
| 6,308,205 B1 | 10/2001 | Carcerano et al. | |
| 6,308,216 B1 | 10/2001 | Goldszmidt et al. | |
| 6,314,463 B1 | 11/2001 | Abbott et al. | |
| 6,336,171 B1 | 1/2002 | Coskrey, IV | |
| 6,339,750 B1 | 1/2002 | Hoyer et al. | |
| 6,374,295 B2 | 4/2002 | Farrow et al. | |
| 6,389,464 B1 | 5/2002 | Krishnamurthy et al. | |
| 6,405,195 B1 | 6/2002 | Ahlberg | |
| 6,418,207 B1 | 7/2002 | Kearns et al. | |
| 6,418,467 B1 | 7/2002 | Schweitzer et al. | |
| 6,430,619 B1 | 8/2002 | Sitaraman et al. | |
| 6,434,619 B1 | 8/2002 | Lim et al. | |
| 6,470,389 B1 | 10/2002 | Chung et al. | |
| 6,473,793 B1 | 10/2002 | Dillon et al. | |
| 6,493,749 B2 | 12/2002 | Paxhia et al. | |
| 6,496,858 B1 * | 12/2002 | Frailong et al. | 709/221 |
| 6,510,466 B1 | 1/2003 | Cox et al. | |
| 6,513,060 B1 | 1/2003 | Nixon et al. | |
| 6,522,738 B1 * | 2/2003 | Cruickshank et al. | 379/201.03 |
| 6,549,944 B1 | 4/2003 | Weinberg et al. | |
| 6,560,639 B1 * | 5/2003 | Dan et al. | 709/218 |
| 6,560,704 B2 | 5/2003 | Dieterman et al. | |
| 6,564,216 B2 | 5/2003 | Waters | |
| 6,567,849 B2 | 5/2003 | Ludovici et al. | |
| 6,570,973 B1 | 5/2003 | Boughman et al. | |
| 6,587,878 B1 | 7/2003 | Merriam | |
| 6,591,298 B1 | 7/2003 | Spicer et al. | |
| 6,598,090 B2 | 7/2003 | Champlin | |
| 6,606,644 B1 | 8/2003 | Ford et al. | |
| 6,611,861 B1 | 8/2003 | Schairer et al. | |
| 6,625,647 B1 | 9/2003 | Barrick, Jr. et al. | |
| 6,629,145 B1 | 9/2003 | Pham et al. | |
| 6,654,804 B1 | 11/2003 | Fleming, III | |
| 6,654,891 B1 | 11/2003 | Borsato et al. | |
| 6,657,990 B1 | 12/2003 | Dilip et al. | |
| 6,658,465 B1 | 12/2003 | Touboul | |
| 6,664,978 B1 | 12/2003 | Kekic et al. | |
| 6,691,148 B1 | 2/2004 | Zinky et al. | |
| 6,704,563 B1 | 3/2004 | Senn et al. | |
| 6,704,778 B1 | 3/2004 | Horman | |
| 6,708,187 B1 | 3/2004 | Shanumgam et al. | |
| 6,718,347 B1 * | 4/2004 | Wilson | 707/201 |
| 6,725,263 B1 | 4/2004 | Torres | |
| 6,748,439 B1 | 6/2004 | Monachello et al. | |
| 6,757,740 B1 | 6/2004 | Parekh et al. | |
| 6,757,836 B1 | 6/2004 | Kumar et al. | |
| 6,760,761 B1 | 7/2004 | Sciacca | |
| 6,769,008 B1 | 7/2004 | Kumar et al. | |
| 6,785,706 B1 * | 8/2004 | Horman | 709/203 |
| 6,788,315 B1 | 9/2004 | Kekic et al. | |
| 6,789,103 B1 | 9/2004 | Kim et al. | |
| 6,789,110 B1 | 9/2004 | Short et al. | |
| 6,789,213 B2 | 9/2004 | Kumar et al. | |
| 6,839,757 B1 | 1/2005 | Romano et al. | |
| 6,842,769 B1 | 1/2005 | Kim et al. | |
| 6,842,783 B1 | 1/2005 | Boivie et al. | |
| 6,857,025 B1 | 2/2005 | Maruyama et al. | |
| 6,862,581 B1 | 3/2005 | Lambiase | |
| 6,862,613 B1 | 3/2005 | Kumar et al. | |
| 6,868,444 B1 | 3/2005 | Kim et al. | |
| 6,877,035 B2 | 4/2005 | Shahabuddin et al. | |
| 6,883,028 B1 | 4/2005 | Johnson et al. | |
| 6,892,229 B1 | 5/2005 | Karadogan et al. | |
| 6,892,230 B1 * | 5/2005 | Gu et al. | 709/220 |
| 6,912,534 B2 | 6/2005 | DeBettencourt et al. | |
| 6,941,361 B1 | 9/2005 | Fink et al. | |
| 6,954,799 B2 | 10/2005 | Lerner | |
| 6,965,928 B1 | 11/2005 | Cox et al. | |
| 6,968,373 B1 | 11/2005 | Norris et al. | |
| 6,976,258 B1 | 12/2005 | Goyal et al. | |
| 6,985,937 B1 | 1/2006 | Keshav et al. | |
| 6,996,510 B1 * | 2/2006 | Reilly et al. | 703/13 |
| 7,039,688 B2 * | 5/2006 | Matsuda et al. | 709/220 |
| 7,058,704 B1 * | 6/2006 | Mangipudi et al. | 709/223 |
| 7,072,934 B2 | 7/2006 | Helgeson et al. | |
| 7,099,956 B2 | 8/2006 | Shuster et al. | |
| 7,111,060 B2 | 9/2006 | Araujo et al. | |
| 7,113,962 B1 * | 9/2006 | Kee et al. | 707/201 |
| 7,127,460 B2 * | 10/2006 | Nixon et al. | 707/8 |
| 7,240,100 B1 | 7/2007 | Wein et al. | |
| 8,131,672 B2 * | 3/2012 | Hind et al. | 707/610 |
| 2001/0010059 A1 | 7/2001 | Burman et al. | |
| 2001/0034831 A1 | 10/2001 | Brustoloni et al. | |
| 2001/0037380 A1 * | 11/2001 | Wall et al. | 709/219 |
| 2001/0051999 A1 | 12/2001 | Hnyk et al. | |
| 2002/0002603 A1 | 1/2002 | Vange | |
| 2002/0002607 A1 | 1/2002 | Lucovici et al. | |
| 2002/0013838 A1 | 1/2002 | Kushida et al. | |
| 2002/0023174 A1 | 2/2002 | Garret et al. | |
| 2002/0065926 A1 * | 5/2002 | Hackney et al. | 709/231 |
| 2002/0069272 A1 | 6/2002 | Kim | |
| 2002/0105911 A1 | 8/2002 | Pruthi et al. | |
| 2004/0260807 A1 | 12/2004 | Glommen et al. | |
| 2005/0044270 A1 | 2/2005 | Grove et al. | |
| 2005/0071442 A1 | 3/2005 | Becker et al. | |
| 2006/0265471 A1 * | 11/2006 | Pitzel et al. | 709/217 |
| 2012/0130953 A1 * | 5/2012 | Hind et al. | 707/638 |

FOREIGN PATENT DOCUMENTS

| | | |
|---|---|---|
| KR | 465301 | 12/2004 |
| WO | 9933211 | 7/1999 |
| WO | 9934544 | 7/1999 |
| WO | 0013456 | 3/2000 |
| WO | 0014940 | 3/2000 |
| WO | 0022534 | 4/2000 |

OTHER PUBLICATIONS

Complaint, Plaintiff, *Web.com, Inc. v. The Go Daddy Group, Inc.*, N.D.Ga. 1:06-CV-1461 (TCB), Jun. 19, 2006, 28 pages.

First Amended Complaint, Plaintiff, *Web.com, Inc. v. The Go Daddy Group, Inc.*, N.D.Ga. 1:06-CV-1461 (TCB), Oct. 13, 2006, 15 pages.

Answer to First Amended Complaint, Defendent, *Web.com, Inc. v. The Go Daddy Group, Inc.*, D.Ariz. CV07-01552-PHX-MHN, Aug. 30, 2007, 10 pages.

Reply to Counterclaims, Plaintiff, *Web.com, Inc. v. The Go Daddy Group, Inc.*, D.Ariz. CV07-01552-PHX-MHN, Sep. 24, 2007, 5 pages.

Preliminary Invalidity Contentions, Defendent, *Web.com, Inc. v. The Go Daddy Group, Inc.*, D.Ariz. CV07-01552-PHX-MHN, Jan. 18, 2008, 127 pages.

"Simon and Oracle: Strengths and Weakness in Using Oracle", Jon Finke, Community Workshop, Jun. 6-11, 1993, 7 pages.

"Simon System Management: Hostmaster and Beyond", Jon Finke, Community Workshop, Jun. 6-11, 1993, 13 pages.

"Rent Extra RCS Disk Space", Unknown, News Cache, vol. 18, No. 2, Oct. 12, 1994, 2 pages.

"Automation of Site Configuration Management", Jon Finke, Proc. of the 11th USENIX Conference on System Administration, pp. 155-168, San Diego, CA, Oct. 26-31, 1997.

Sudo source code, version 1.5.7, Unknown, Nov. 20, 1998, 212 pages.

Sudo Manual, Todd C. Miller et al., http://web.archive.org/web/19990224034205/http://www.courtesan.com/sudo/man/sudo.html, Feb. 24, 1999, 4 pages.

"User Manager Software", Branden Williams, Linux Journal, Dec. 1998, 3 pages.

Sudo Web Site, Todd C. Miller et al., http://web.archive.org/web/19990219233043/http://www.courtesan.com/sudo/, Feb. 18, 1999, 4 pages.

Supplemental Preliminary:Invalidity Contentions, Defendent, *Web.com, Inc.* v. *The Go Daddy Group, Inc.*, D.Ariz. CV07-01552-PHX-MHN, Mar. 27, 2008, 16 pages.
Opening Claim Construction Brief, Plaintiff, *Web.com, Inc.* v. *The Go Daddy Group, Inc.*, D.Ariz. CV07-01552-PHX-MHN, May 19, 2008, 57 pages.
Declaration i.s.o. Plaintiffs Opening Claim Construction Brief, K. Hermann, *Web.com, Inc.* v. *The Go Daddy Group, Inc.*, D.Ariz. CV07-01552-PHX-MHN, May 19, 2008, 385 pages.
"IEEE 100 The Authoritative Dictionary of IEEE Standards Terms", Seventh Ed., IEEE Press, ISBN: 9780738126012, Dec. 2000, p. 993.
Definition of "daemon" from Free On-Line Dictionary of Computing (FOLDOC), http://foldoc.org/?query=daemon, May 11, 1995.
"Microsoft Press Computer Dictionary", Third Ed., Microsoft Press, ISBN: 9781572314467, Jul. 1997, p. 104.
Opening Claim Construction Brief, Defendent, *Web.com, Inc.* v. *The Go Daddy Group, Inc.*, D.Ariz. CV07-01552-PHX-MHN, May 19, 2008, 46 pages.
Declaration i.s.o. Defendent's Opening Claim Construction Brief, L. Nguyen, *Web.com, Inc.* v. *The Go Daddy Group, Inc.*, D.Ariz. CV07-01552-PHX-MHN, May 19, 2008, 1174 pages.
USPTO File History of U.S. Pat. No. 6,789,103 to Kim et al., dated Sep. 7, 2004, 210 pages.
USPTO File History of U.S. Pat. No. 6,842,769 to Kim et al., dated Jan. 11, 2005, 185 pages.
USPTO File History of U.S. Pat. No. 6,868,444 to Kim et al., dated Mar. 15, 2005, 188 pages.
Expert Report for Web.com, Inc., Dr. A. D. Rubin, *Web.com, Inc.* v. *The Go Daddy Group, Inc.*, D.Ariz. CV07-01552-PHX-MHN, Apr. 6, 2008, 22 pgs.
Depostion Transcript of Dr. A. D. Rubin, *Web.com, Inc.* v. *The Go Daddy Group, Inc.*, D.Ariz. CV07-01552-PHX-MHN, May 6, 2008, 44 pages.
Definition of "routine" from Free On-Line Dictionary of Computing, http://foldoc.org/index.cgi?query=routine&action=Search, Oct. 1, 1996.
Reply Claim Construction Brief, Plaintiff, *Web.com, Inc.* v. *The Go Daddy Group, Inc.*, D.Ariz. CV07-01552-PHX-MHN, Jul. 2, 2008, 54 pages.
Transcript of Hearing on Defendent's Motion for Summary Judgment, *Web.com, Inc.* v. *The Go Daddy Group, Inc.*, D.Ariz. CV07-01552-PHX-MHN, Jul. 22, 2008, 90 pages.
Transcript of Markman Hearing, *Web.com, Inc.* v. *The Go Daddy Group, Inc.*, D.Ariz. CV07-01552-PHX-MHN, Jul. 23, 2008, 135 pages.
Post-Markman Hearing Claim Construction Brief, Plaintiff, *Web.com, Inc.* v. *The Go Daddy Group, Inc.*, D.Ariz. CV07-01552-PHX-MHN, Aug. 15, 2008, 18 pages.
Post-Markman Hearing Responsive Claim Construction Brief, Defendent, *Web.com, Inc.* v. *The Go Daddy Group, Inc.*, D.Ariz. CV07-01552-PHX-MHN, Aug. 22, 2008, 21 pages.
Post-Markman Hearing Claim Construction Reply Brief, Plaintiff, *Web.com, Inc.* v. *The Go Daddy Group, Inc.*, D.Ariz. CV07-01552-PHX-MHN, Aug. 27, 2008, 13 pages.
Declaration i.s.o. Plaintiff's Post-Markman Claim Constr Reply Br, Plaintiff, *Web.com, Inc.* v. *The Go Daddy Group, Inc.*, D.Ariz. CV07-01552-PHX-MHN, Aug. 27, 2008, 92 pages.
Stemm, M., Katz, R., and Seshan, S., "A Network Measurement Architecture for Adaptive Applications", Proceedings of the IEEE Computer and Communications Societies INFOCIM 2000, vol. 1, pp. 285-294, Mar. 2000.
Lawrence, S. and Giles, C. L., "Accessibility of Information on the Web", Intelligence vol. 11, No. 1 pp. 32-39 (Apr. 2000) reprinted from Nature, vol. 400, pp. 107-109, Jul. 1999.
Bestavros, A., Katagai, N., and Londono, J., "Admission Control and Scheduling for High-Performance WWW Servers", Technical Report 1997-015, Boston University, 23 pages, Aug. 1997.

Francis, P., Jamin, S., Paxson, V., Zhang, L., Gryniewicz, D., and Jin, Y., "An architecture for a global Internet host distance estimation service", Proceedings of the IEEE Computer and Communications Societies INFOCIM 1999, vol. 1 (abstract only), Mar. 1999.
Pappalardo, D., "Bandwidth management can lead to better ISP service", Network World, Sep. 8, 1997, pp. 1-2.
Cameron, I. and Patrick, D., "BT Web WorldTM—Web hosting for every business need", British Telecommunications Engineering, vol. 16, No. 4 (abstract only), Jan. 1998.
Bugos, A. R., "Dial-in World-Wide Web (WWW) Information Services for Use Within a Local Community Network" Proceedings of the Second International Workshop on Community Networking, pp. 179-183, Jun. 1995.
Chuang, J. and Sirbu, M., "Distributed Network Storage with Quality-of-Service Guarantees," Proceedings of the Internet Society INET'99 Conference, 35 pages, Jun. 1999.
Tan, Y. S., Lindquist, D. B., Rowe, T. O., and Hind, J. R., "IBM eNetwork Host On-Demand: The beginning of a new era for accessing host information in a Web environment", IBM Systems Journal, vol. 37, No. 1, pp. 133-151, Nov. 1998.
Zhao, W., Olshefski, D., and Schulzrinne, H., "Internet Quality of Service: an Overview" Technical Report CUCS-003-00, Columbia University, 11 pages, Feb. 2000.
Goldszmidt, G. S., "Load Management for Scaling Up Internet Services", IEEE Network Operation and Management Symposium, vol. 3, pp. 828-835, Feb. 1998.
Muller, N. J., "Managing Service Level Agreements", International Journal of Network Management, vol. 9, No. 3, pp. 155-166, May 1999.
Brisbin, S., "Open for Web business," Macworld, vol. 14, No. 11, pp. 153-154, Nov. 1997.
Wyle, M., "Preparing Your Site for Speed and Reliability World Wide Web", Web Techniques, vol. 5, No. 1 (abstract only), Jan. 2000.
Borella, M. S., Upadhyay, V., and Sidhu, I., "Pricing Framework for a Differential Services Internet", European Transactions on Telecommunications, vol. 10, No. 3, pp. 275-288, May 1999.
Jain, P. and Schmidt, D. C., "Service Configurator, A Pattern for Dynamic Configuration of Services", Proceedings of the USENIX Conference on Object-Oriented Technologies (COOTS'97), vol. 3, 11 pages, Jun. 1997.
Schilit, B. N., Douglis, F., Kristol, D. M., Krzyzanowski, P., Sienicki, J., and Trotter, J. A. "TeleWeb: Loosely Connected Access to the World Wide Web", Proceedings of the international World Wide Web conference on Computer networks and ISDN systems, pp. 1431-1444 (16 pages), May 1996.
Gareiss, R., "Web-Hosting Services: No Mess, Less Stress", Data Communications, vol. 25, No. 16, (abstract only), Nov. 21, 1996.
Maltzahn, C., Richardson, K. J., and Grunwald, D., "Performance Issues of Enterprise Level Web Proxies", ACM SIGMETRICS Performance Evaluation Review, vol. 25, No. 1 pp. 13-23, Jun. 1997.
Depostion Transcript of Jonathan E. Finke, *Web.com, Inc.* v. *The Go Daddy Group, Inc.*, D.Ariz. CV07-01552-PHX-MHN, Jul. 9, 2008, 393 pages.
"Disk Charging in AFS: Simon Management System"Jon Finke, Community Workshop, Jun. 13-19, 1992, 8 pages.
"Students: Make a WWW Homepage and Register it in PRInfo", Unknown, News Cache, vol. 19, No. 2, Oct. 11, 1995, 3 pages.
"Reduce Your Unused Desk Space", Unknown, News Cache, vol. 19, No. 5, Mar. 6, 1996, 1 page.
"Alumni: Now You Can Rent Additional Disk Space", Unknown, News Cache, vol. 18, No. 6, May 3, 1995, 1 page.
"DAPS: Distributed Administration Processing System", Jon Finke, unpublished paper dated May 25, 1999, 10 pages.
"New FTP Service for RCS", Unknown, The Kiosk, vol. 21, No. 1, Aug. 20, 1997, 2 pages.

\* cited by examiner

| SERVER ID | DESCRIPTION |
|---|---|
| HP1001 | NT, No.43223 |
| HP1002 | NT, No.54677 |
| HP1003 | Linux, No.321 |
| | |
| | |

SERVER TABLE

FIG. 9

| SERVER ID | SITE ID | PASSWORD | DOMAIN |
|---|---|---|---|
| HP1008 | 3452C | 72xc00 | site.com |
| | | | |
| | | | |
| | | | |
| | | | |

SITE TABLE

FIG. 10

| SERVER ID | SITE ID | SPACE | STREAMS |
|---|---|---|---|
| HP1004 | 7568A | 100 MB | 20 |
| HP1001 | 2234A | 50 MB | 10 |
|  |  |  |  |
|  |  |  |  |
|  |  |  |  |

MEDIA SERVER TABLE

*FIG. 11*

| SERVER ID | SITE ID | SPACE | IP | MEMORY | CPU |
|---|---|---|---|---|---|
| HP1004 | 9067C | 100 MB |  |  |  |
| HP1002 | 4356E | 10 MB |  |  |  |
|  |  |  |  |  |  |
|  |  |  |  |  |  |
|  |  |  |  |  |  |

WEB SERVER TABLE

*FIG. 12*

SYSTEM AND METHOD FOR MANAGING SERVER CONFIGURATIONS

CROSS REFERENCE TO RELATED APPLICATIONS

This application is a continuation of U.S. utility application entitled "Automatically Configured Network Server" having U.S. Ser. No. 09/565,270, filed May 5, 2000, now issued as U.S. Pat. No. 6,842,769, which is entirely incorporated herein by reference.

This application is related to U.S. utility application entitled "System and Method for Managing Server Configurations" having U.S. Ser. No. 09/565,520, filed May 5, 2000, now abandoned, which is entirely incorporated herein by reference.

This application is related to U.S. utility application entitled "Method of Assigning Addresses to Network Resources" having U.S. Ser. No. 09/565,268, filed May 5, 2000, now abandoned, which is entirely incorporated herein by reference.

This application is related to U.S. utility application entitled "Synchronized Server Parameter Database" having U.S. Ser. No. 09/565,269, filed May 5, 2000 now issued as U.S. Pat. No. 6,789,103, which is entirely incorporated herein by reference.

BACKGROUND

1. Field

The invention relates to computer networks. In particular, the invention relates to managing network server configurations.

2. Description of Related Art

Explosive growth of the Internet, and in particular e-commerce, has resulted in a dramatic increase in the rate at which companies and individuals are creating network resources such as World-Wide-Web sites, email accounts, and the like. Most companies do not have a direct connection to the Internet and thus contract with a web hosting company, or internet service provider (ISP), to provide access to the Internet and to host the resources they wish to make available to other Internet users.

Typically a web hosting service provider may provide a wide range of e-commerce, application hosting, and connectivity services. For example, a company or individual may contract with a web hosting company to provide a specified amount of memory on a server for the company to establish and maintain its web site. In addition, the company may contract for other types of services, such as, for example, email services, secure socket layer (SSL), file transfer protocol (FTP) service, database services, and real media service allowing streaming audio and video from the company's web site.

After a company or individual has established its initial set of services with a web hosting service provider, they may wish to change the services it has contracted for. For example, if the company had not originally contracted for real media service, it may wish to add this feature to its web site. Typically, when a company wants to change the services it has contracted for, a request for the desired change would be communicated to the web hosting service provider. At the web hosting service provider, a system administrator would determine if the new services are available to the requesting company and which network servers of the web host's system should be configured to accommodate the requested configuration. The system administrator would then access the appropriate server and change the server configuration to conform to the requested change. In some instances, accessing the appropriate server may require the system administrator to travel to a remote site where a server is located. At some facilities, this process was partially automated by programming the servers with scripts that performed some tasks of the configuration process. However, administrator access to the server was still required to implement the configuration changes.

In addition, web hosting service providers must maintain accurate records of the server configurations. The records of the server configurations allow the web hosting service provider to monitor equipment utilization to help determine, for example, when increased customer demand would justify upgrading existing equipment, or bringing additional equipment on line. Accurate records are also required to ensure proper billing of companies contracting for the services provided. To both maintain server configurations according to customer desires, and to simultaneously track server configurations as they are altered over time, a system administrator would both update server configurations and also update a database containing information regarding server configurations. Requiring the system administrator to update a database is prone to errors in the entry, as well as inadvertently failing to record a configuration change that was made.

Therefore, there is a need in the art for a method and apparatus to improve the speed and efficiency of matching server configurations with customer desires. In addition, there is a need in the art for a method and apparatus to improve the recording and monitoring of network equipment configuration.

SUMMARY

In one embodiment, the invention comprises a method of synchronizing configuration parameters on a server with a database of stored configuration parameters comprising automatically updating the configuration parameters on the server in response to updating the database of stored configuration parameters. Systems for processing information are also provided. In one embodiment, such a system comprises a plurality of network servers having application programs running thereon, the application programs comprising configuration parameters defining at least some aspect of application program operation, and a database storing at least some of the configuration parameters. In this embodiment, a communication link connecting the database to the plurality of network servers is provided to transfer the configuration parameters to the plurality of network servers.

BRIEF DESCRIPTION OF THE DRAWINGS

FIG. 9 is an illustration of a server table of FIG. 5.

FIG. 10 is an illustration of the site table of FIG. 5.

FIG. 11 is an illustration of a first application program table of FIG. 5.

FIG. 12 is an illustration of a second application program table of FIG. 5.

DETAILED DESCRIPTION

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
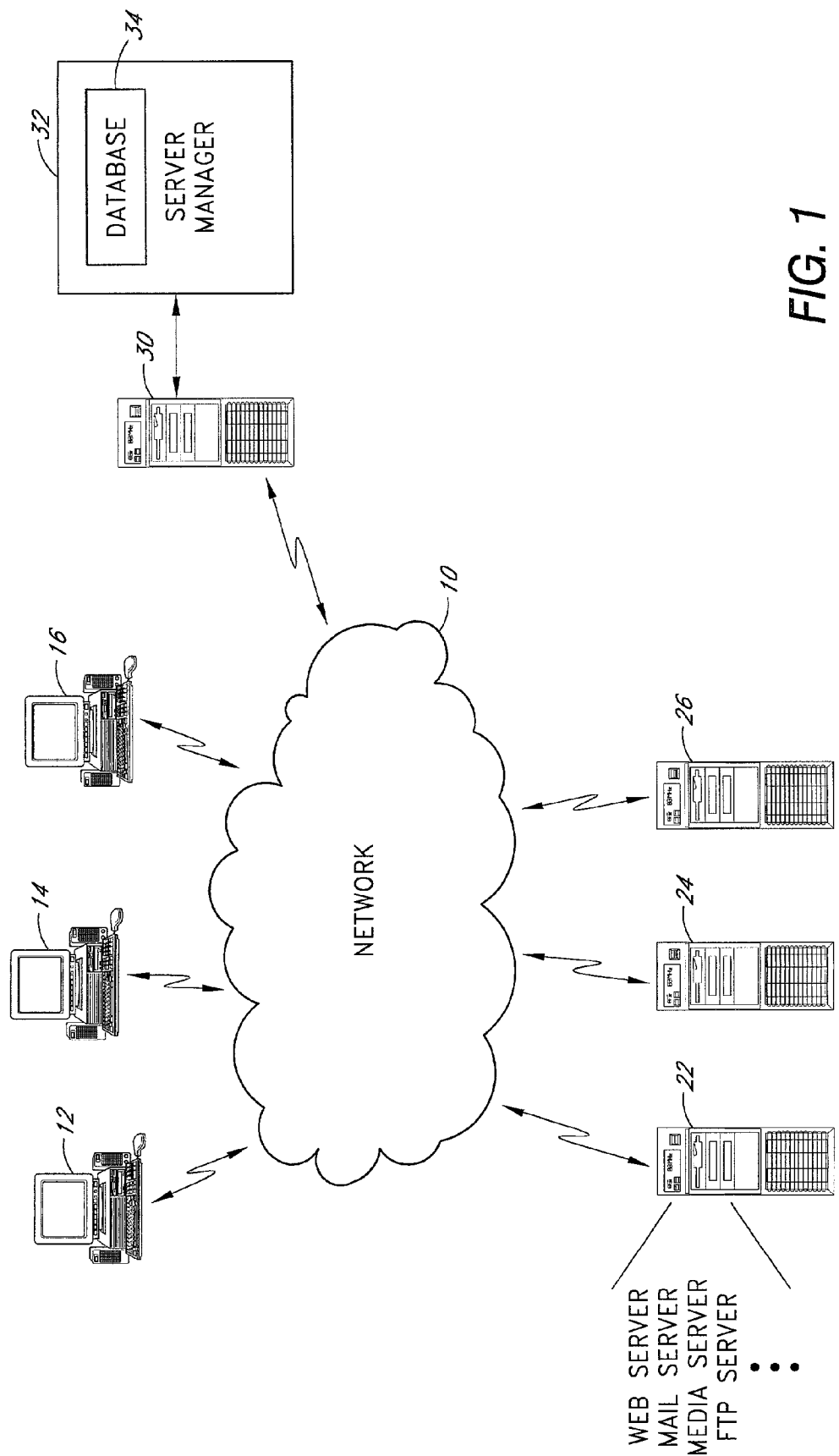
FIG. 1 as a diagram of a computer network in one embodiment of the invention.

FIG. 1 shows an exemplary computer network 10 connecting one or more computing machines. The network 10 may be any type of electronically connected group of computers including, for instance, the following networks: Internet, Intranet, Local Area Networks (LAN), Wide Area Networks (WAN) or an interconnected combination of these network types. In addition, the connectivity within the network 10 may be, for example, remote modem, Ethernet (IEEE 802.3), Token Ring (IEEE 802.5), Fiber Distributed Datalink Interface (FDDI), Asynchronous Transfer Mode (ATM), or any other communication protocol. Computing devices linked to the network may be desktop, server, portable, hand-held, set-top box, personal digital assistant (PDA), a terminal, or any other desired type or configuration. Depending on their functionality, the network connected devices may vary widely in processing power, internal memory, and other performance aspects. Communications within the network and to or from the computing devices connected to the network may be either wired or wireless. Wireless communication is especially advantageous for network connected portable or hand-held devices. The network 10 may include, at least in part, the world-wide public Internet which generally connects a plurality of users in accordance with a client-server model in accordance with the transmission control protocol/internet protocol (TCP/IP) specification. A client-server network is a dominant model for communicating between two computers. Using this relationship, a client computer (the "client") issues one or more commands to a server computer (the "server"). The server fulfills client commands by accessing available network resources and returning information to the client pursuant to client commands. During this process, client computer systems and network resources resident on the network servers are assigned a network address for identification during communications between elements of the network. Communications from other network connected systems to the servers will include the network address of the relevant server/network resource as part of the communication so that the appropriate destination of the data/request is identified as the recipient. When the network 10 comprises the global Internet, the network address is an IP address in the TCP/IP format which may, at least in part, route data to an e-mail account, a web-site, or other Internet tool resident on the server. In this way, information and services which are resident on the network servers may be available to the web browser of a client computer through a domain name (e.g. www.site.com) which maps to the IP address of the network server.

As shown in FIG. 1, a plurality of clients 12, 14, and 16 are connected to the network 10 via respective communication links. Typically, each of these clients may access the network 10 via any desired form of communication, such as via a dial-up modem connection, cable link, a digital subscriber line (DSL), wireless or satellite link, or any other form of communication. Each client may communicate using any machine that is compatible with the network 10, such as a personal computer (PC), work station, dedicated terminal, personal data assistant (PDA), or other similar equipment. The clients 12, 14, and 16 may or may not be located in the same geographical area.

As shown in FIG. 1, a plurality of servers 22, 24, and 26 are connected to the network 10 to serve clients that are in communication with the network 10. Each server is typically a powerful computer or device that manages network resources and responds to client commands. As is known in the art, the servers include computer readable data storage media such as hard disk drives and RAM memory that store program instructions and data. Using such stored programs, the servers 22, 24, 26 run application programs that respond to client commands. As shown in FIG. 1, for example, the server 22 may run a web server application for responding to client requests for HTML pages. It may also run a mail server application for receiving and routing electronic mail. Other application programs, such as an FTP server or a media server for streaming audio/video data to clients may also be running on the server 22. In some cases, different servers may be dedicated to performing different tasks. For example, the server 22 may be a dedicated web server that manages resources relating to web sites for various users, whereas the server 24 may be dedicated to provide electronic mail (email) management. Other servers may be dedicated for media (audio, video, etc.), file transfer protocol (FTP), or a combination of any two or more services that are typically available or provided over a network. Each server may be in a location that is the same as or different from that of other servers. Moreover, there may be multiple servers that perform mirrored tasks for users, thereby relieving congestion or minimizing traffic directed to and from a single server. In one embodiment of the invention, the servers 22, 24, 26 are under the control of a web hosting provider in the business of maintaining and delivering third party content over the network 10.

Web hosting providers deliver services to two different types of clients. One type, referred to herein as a "browser", requests content from the servers 22, 24, 26 such as web pages, email messages, video clips, etc. A second type of client, referred to herein as a "user", hires the web hosting provider to maintain a network resource such as a web site, and to make it available to browsers. Users contract with the web hosting provider to make memory space, processor capacity, and communication bandwidth available for their desired network resource, generally paying the web hosting provider in accordance with the amount of server resources the user desires to utilize.

In order for the web hosting provider to provide services for both of these clients, application programs which manage the network resources hosted by the servers must be properly configured. The program configuration process generally involves defining a set of parameters which control, at least in part, the application program's response to browser requests and which also define, at least in part, the server resources available to a particular user. In conventional web hosting environments, only network administrators associated with the web hosting company that owned the servers 22, 24, 26 were allowed access to the application program parameters to change application program operation so as to modify, for example, the amount of storage space allocated to a given user's web site. This helped insure tight control of the web hosting service provider over application program configuration. However, all user requests for new server resources or a reconfiguration of their existing resources required human intervention, which is slow and relatively expensive.

Figure 2:
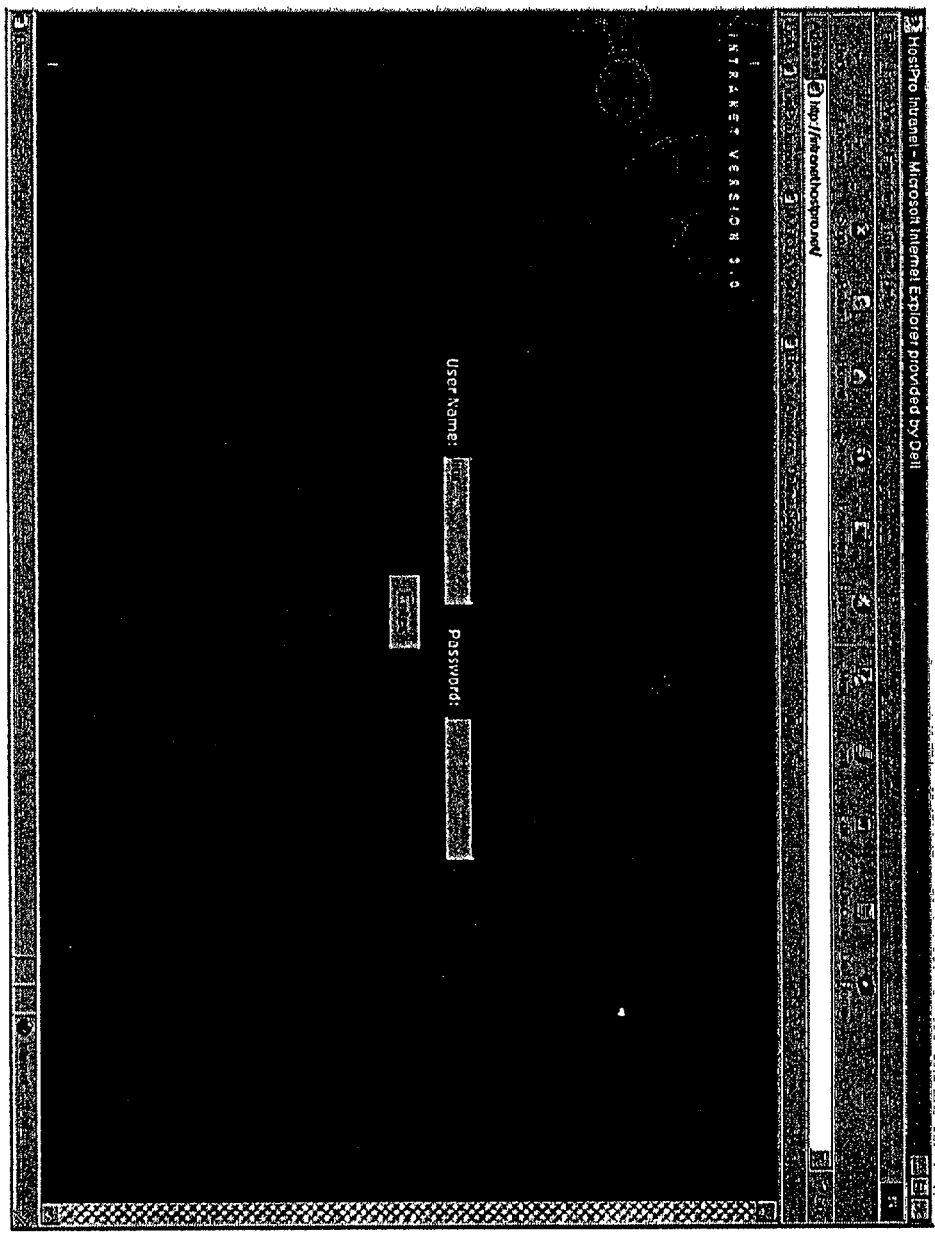
FIG. 2 is a screen display of a login screen for modifying configuration parameters.

In one embodiment of the invention, however, the user is provided access to application program parameters in a manner which still ensures adequate control over program configuration by the web hosting service provider. In one embodiment, an intranet server 30 is in communication with the network 10 via a communication link. The intranet server 30 is in communication with a server manager 32. The server manager 32 comprises a database of the application program configuration parameters which are being utilized in the servers 22, 24, 26. In this embodiment, users modify the database 34 via the intranet 30, and the server manager 32 interacts with the servers 22, 24, 26 to modify application program parameters so that they match the content of the database. In a typical operation, a user logs onto the intranet server 30 by connecting to the intranet 30 via computer 12 and entering authentication information, such as a username and password. An example screen display for entering this information is provided in FIG. 2.

Figure 3:
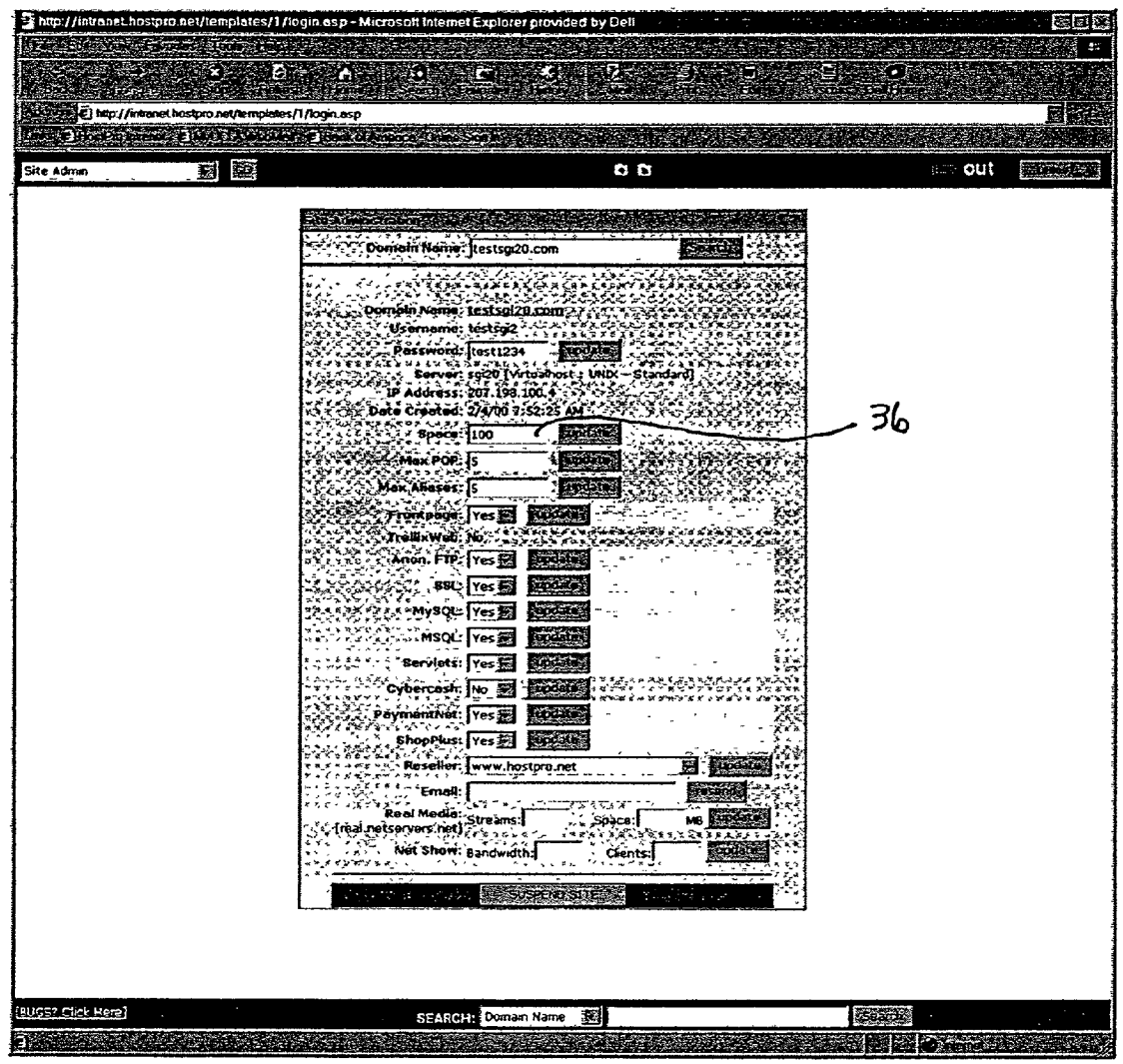
FIG. 3 is a screen display allowing updates to a configuration parameter database.

In some advantageous embodiments, when the user wishes to sign up for new service or modify an existing service, the intranet server 30 authenticates the user (via the screen display of FIG. 2 for example) and provides the user with an interactive screen display/control panel that allows the user to access configuration parameters for a particular application program. One example of such an interactive screen display is illustrated in FIG. 3. In this embodiment, the user is presented with a number of modifiable text boxes that describe aspects of the configuration of the user's web site or other network resource.

For example, if a user desires to increase memory space reserved on a server for its web site, the user is provided with a "memory space" field 36 (FIG. 3) in which the user specifies the desired memory space. In response to receiving this information, the intranet server 30 updates the database 34. The server manager 32 forwards this information to the appropriate server, and the new parameter is used during application program operation. Thus, the intranet server 30 is configured to provide users with access to configuration parameters of hosted network resources (e.g., web pages, email, FTP sites, media sites, etc.), for which a user has contracted with the web hosting service provider.

As will be described in additional detail below, the configuration parameters may be stored in the database 34 in the format of a plurality of tables. When the user modifies the desired configuration parameter (e.g., memory space) for its web site, the intranet server 30 communicates such modification along with user identification information to the server manager 32. In turn, the server manager 32 updates one or more tables that include this parameter. Once the one or more tables are updated in the server manager 32, the server manager 32 communicates one or more commands to one or more of the servers 22, 24, and 26 indicating that the one or more tables of the server manager 32 has been modified. In one embodiment, the servers are configured to run a dedicated program (e.g., a daemon) that is triggered to retrieve the modified parameter from the updated table of the server manager 32. As is known in the art, a daemon commonly refers to a process that runs in the background and performs a specified operation at predefined times or in response to certain events. After being triggered by the server manager 32, the daemon updates the configuration of the application program (e.g., web server) with the retrieved parameter. One embodiment of this process is described in further detail in the description of the processes of FIGS. 4-6. Generally, the intranet server 30, server manager 32, and network servers 22, 24, 26 are all under the management and control of the web hosting service provider. In some embodiments, these computers will be located in a single facility and connected to a common local area network. In other embodiments, these computers are widely separated geographically and may communicate over the public Internet. The computers 12, 14, 16, utilized by the users to access the intranet 30 will generally be geographically remote from the server manager 32 and the servers 22, 24, 26, although it will be appreciated that one or more of these devices 12, 14, 16 may be directly connected to the intranet 30 or other LAN which includes the server manager 32.

Figure 4:
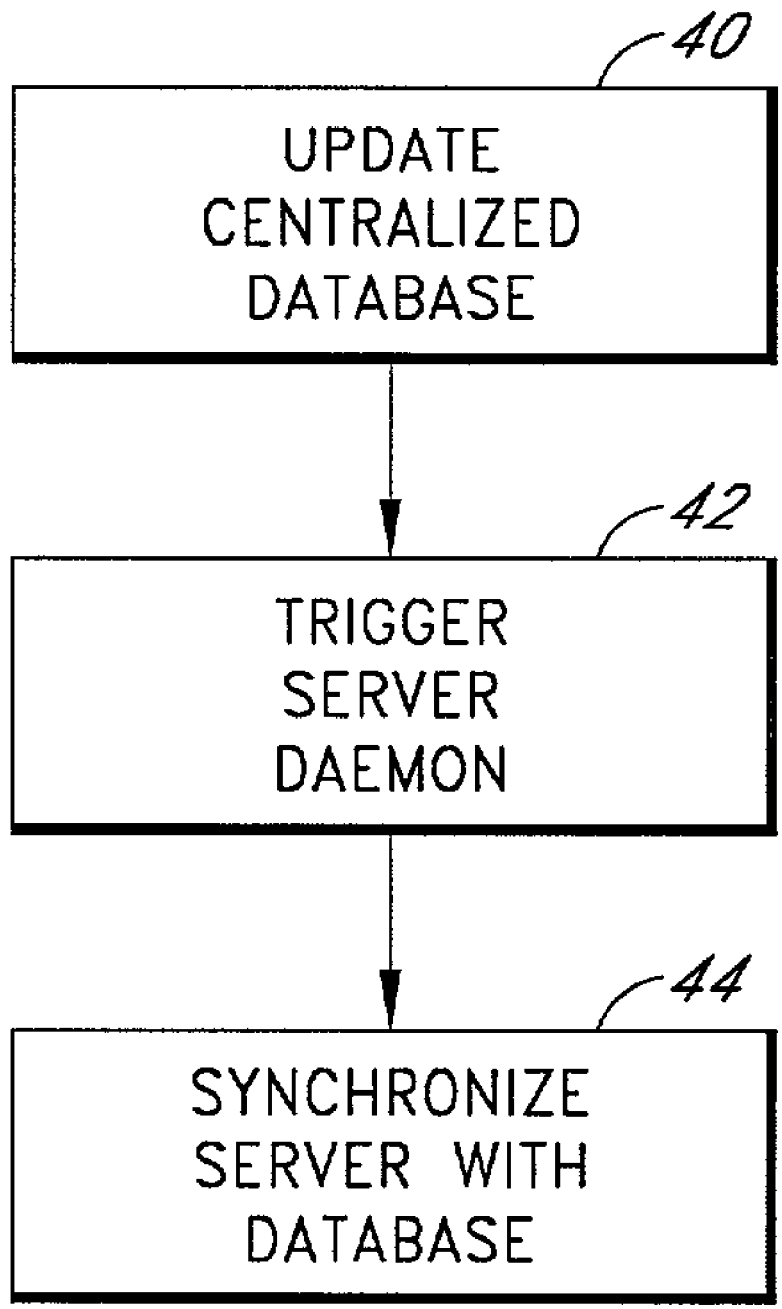
FIG. 4 is a flow chart of an automated server configuration process in one embodiment of the invention.

FIG. 4 is a flowchart of a method of updating a server configuration. The process begins in block 40, where a centralized database is updated with selected parameters to make the desired change to the configuration of a selected application program. This modification to the database may be made by a user, as described above, or by a network administrator associated with the web hosting service provider. After the centralized database has been updated, flow continues to block 42. In block 42, a program residing on a selected server, commonly referred to as a daemon, is initiated or triggered. When the daemon program is triggered, it will read the modified fields in the updated centralized database. Flow then continues to block 44. In block 44, the daemon, using the parameters from the modified fields of the centralized database, will update or synchronize the server configuration with the updated centralized database fields accordingly. In this way, a database of server configurations is kept consistent with the actual server configurations automatically and with little or no human intervention.

Figure 5:
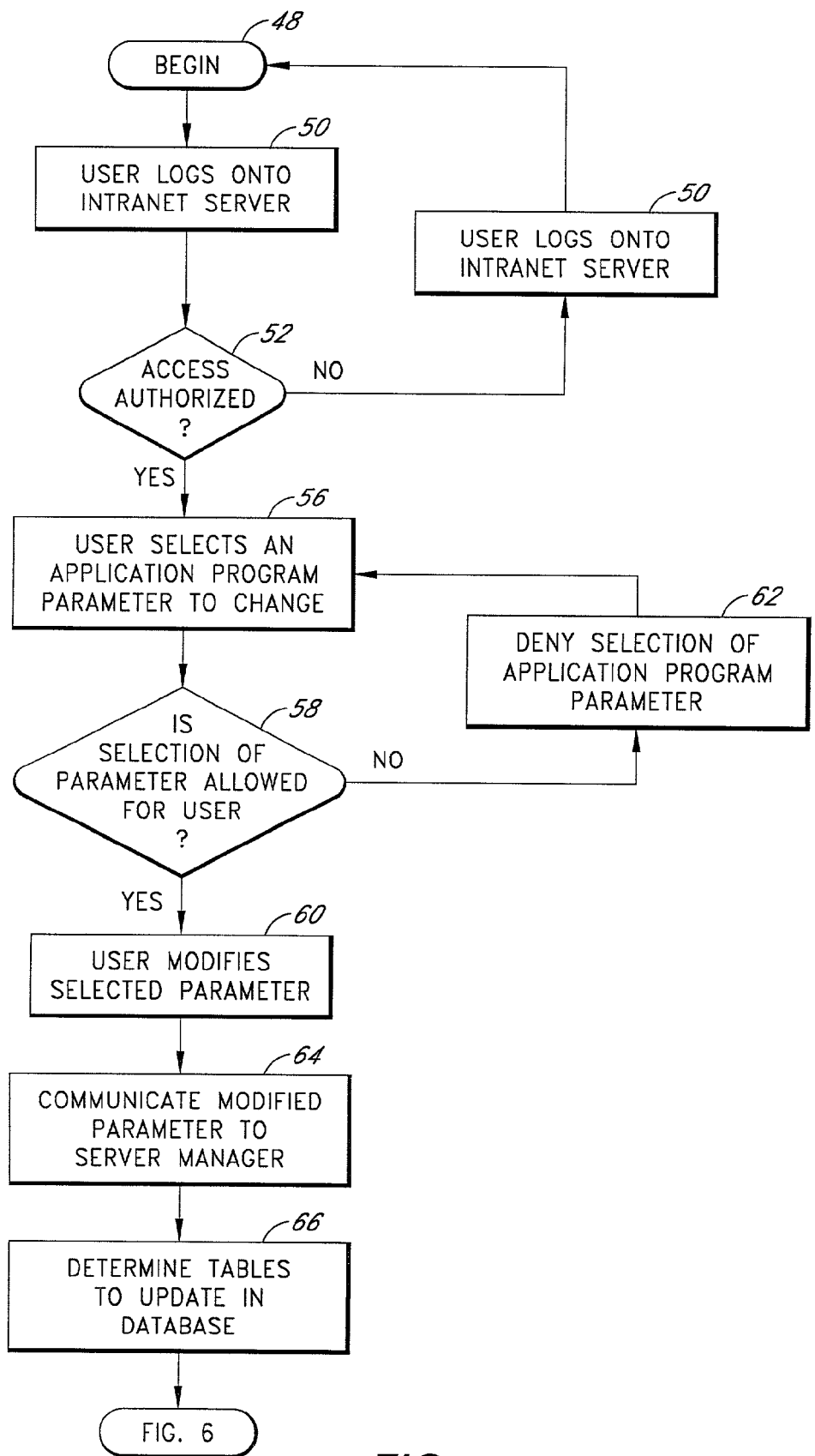
FIG. 5 is a flow chart of one method of user updating of a configuration database.
Figure 6:
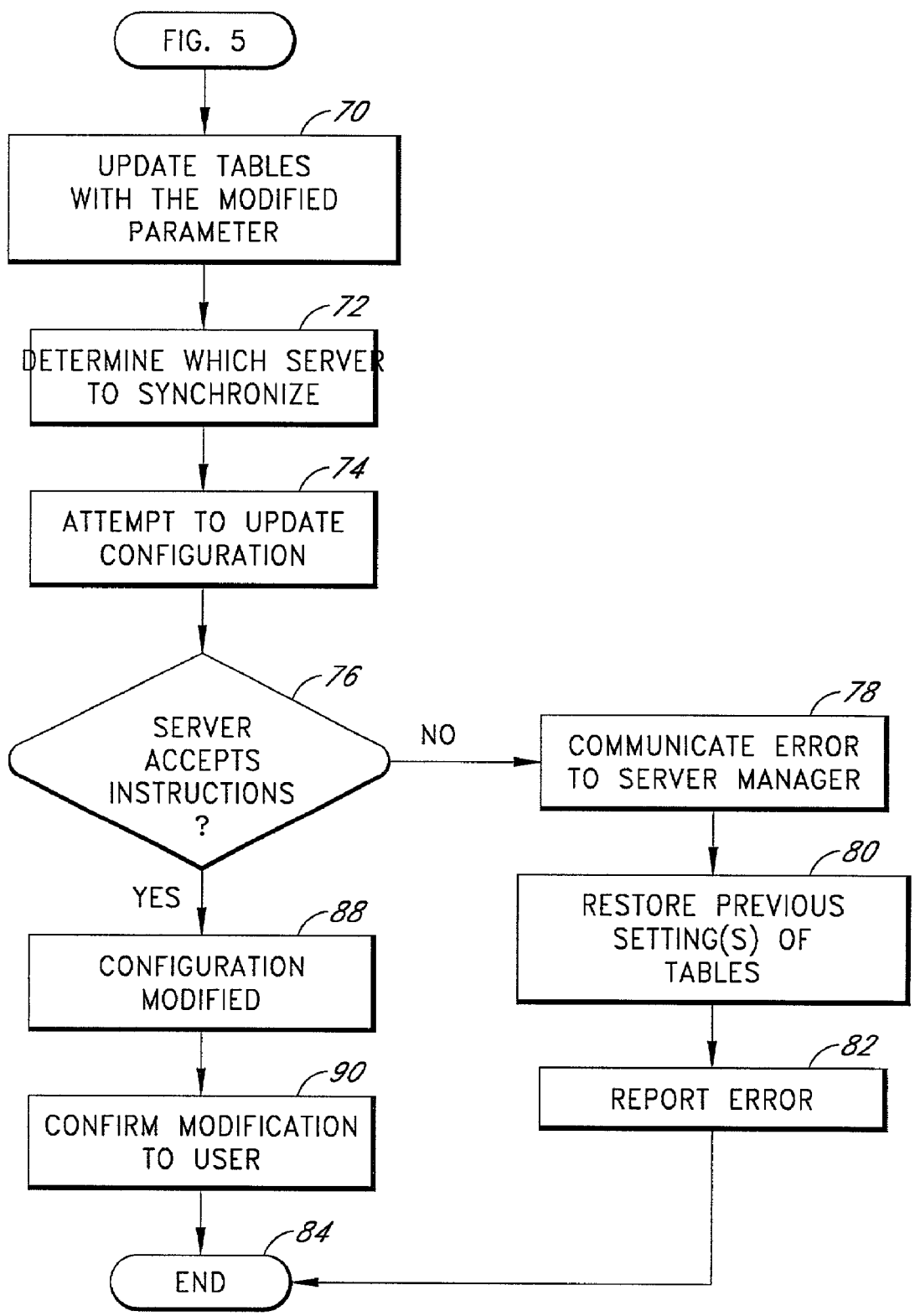
FIG. 6 is a flow chart of one method of user updating of a configuration database.

FIGS. 5 and 6 are flowcharts illustrating a specific embodiment of a method of modification of a server configuration in response to a user request. Process flow begins in block 48. In block 50, a user logs on to the web hosting Intranet server. In block 52, user access to the Intranet server is authenticated. User authorization may be determined through a set of criteria, or "business rules." For example, user access may be denied if the user does not have a valid account, or if the user is not current in their account balance.

If user access is not authorized, flow continues to block 54. In block 54, user access to the web hosting Intranet is denied and flow loops back to block 50. Returning to block 54, if user access is authorized, flow continues to block 56. In block 56, the user selects an application program parameter to change. For example, the user may select a web server configuration application program and request the amount of memory allocated to the user website be modified, such as, for example, to increase the memory allocated from 5 megabytes to 10 megabytes. In another example, the user may select an email application program. For example, the user may add new email accounts or delete existing ones. After the user has selected the application program parameter desired to be changed, flow continues to block 58.

In block 58, the application program parameter selected by the user is checked to determine if it is a parameter the user is allowed to modify. If the user has selected a parameter it is not allowed to modify, such as, for example, attempting to modify a service the user has not contracted for, flow continues to block 60. In block 60, the user is notified that the desired selection has been denied. Flow then continues to block 58. If the user has selected a parameter that is allowed to be modified, flow continues to block 62. In block 62, the user modifies the selected parameter as desired. In some embodiments, these process steps are accomplished by routing a control panel to the user which only allows the user access to those parameters the user is allowed to change. Referring back to FIG. 3, for example, a web-site modification control panel is illustrated which allows the user to modify some aspects of host service but not others. As described above, a space field allows the user to modify the space allocated to the site. However, the host server that the site is resident on and the associated IP address of the site are shown on the control panel, but are not user modifiable. In block 64, the modified parameter is communicated to the server manager. Flow then continues to block 66. In block 66, the server manager evaluates the modified parameter and determines which table or tables are required to be updated in the server manager database. Flow then continues to block 70 in FIG. 6.

In block 70, the server manager updates the tables in the database with the modified parameters. In block 72, the server manager determines which server to synchronize with the updated database reflecting the user request. The server manager may determine a single server configuration is to be updated, or that a plurality of server configurations are to be updated, in response to the user request. Flow then continues to block 74.

In block 74, the server manager instructs the desired server, or plurality of servers, to update their configuration settings. Typically, updating of server configuration settings is performed by a server resident program, such as, for example, a daemon program as described above. Flow then continues to block 76.

In block 76, the server being reconfigured determines if it can accept the instructions and reconfigure itself in the desired manner. For example, if a request of additional memory for a web site is received by a server, the server will determine if there is sufficient memory available to perform the desired reconfiguration. If the server is unable to accept and perform the instructions, flow continues to block 78.

In block 78, the server communicates its inability to accept and perform the requested instructions by notifying the server manager of an error. Flow then continues to block 80. In block 80, the server manager upon receiving the error message restores the previous settings of parameters in the database tables. By restoring the previous settings of parameters in the tables, the server manager database remains synchronized with the server configuration. Flow then continues to block 82. In block 82, an error is reported to the user notifying the user that the requested modification was not performed. Flow then continues to block 84 where flow ends.

Returning to block 76, if the server accepts the instruction and can perform the reconfiguration, flow continues to block 88. In block 88, the server modifies the server configuration in accordance with the updated configuration settings. Flow then continues to block 90. In block 90, the server confirms to the user that the requested modification has been performed. Because the server has been successfully reconfigured, the server manager database is synchronized with the server configuration. It is possible, if the server being reconfigured is down, for example, that no error message or confirmation message is received by the server manager. In this case, the database modification will be reversed, and an error reported, as described above when an explicit error message is received. Flow then continues to block 84 where the process ends.

Figure 7:
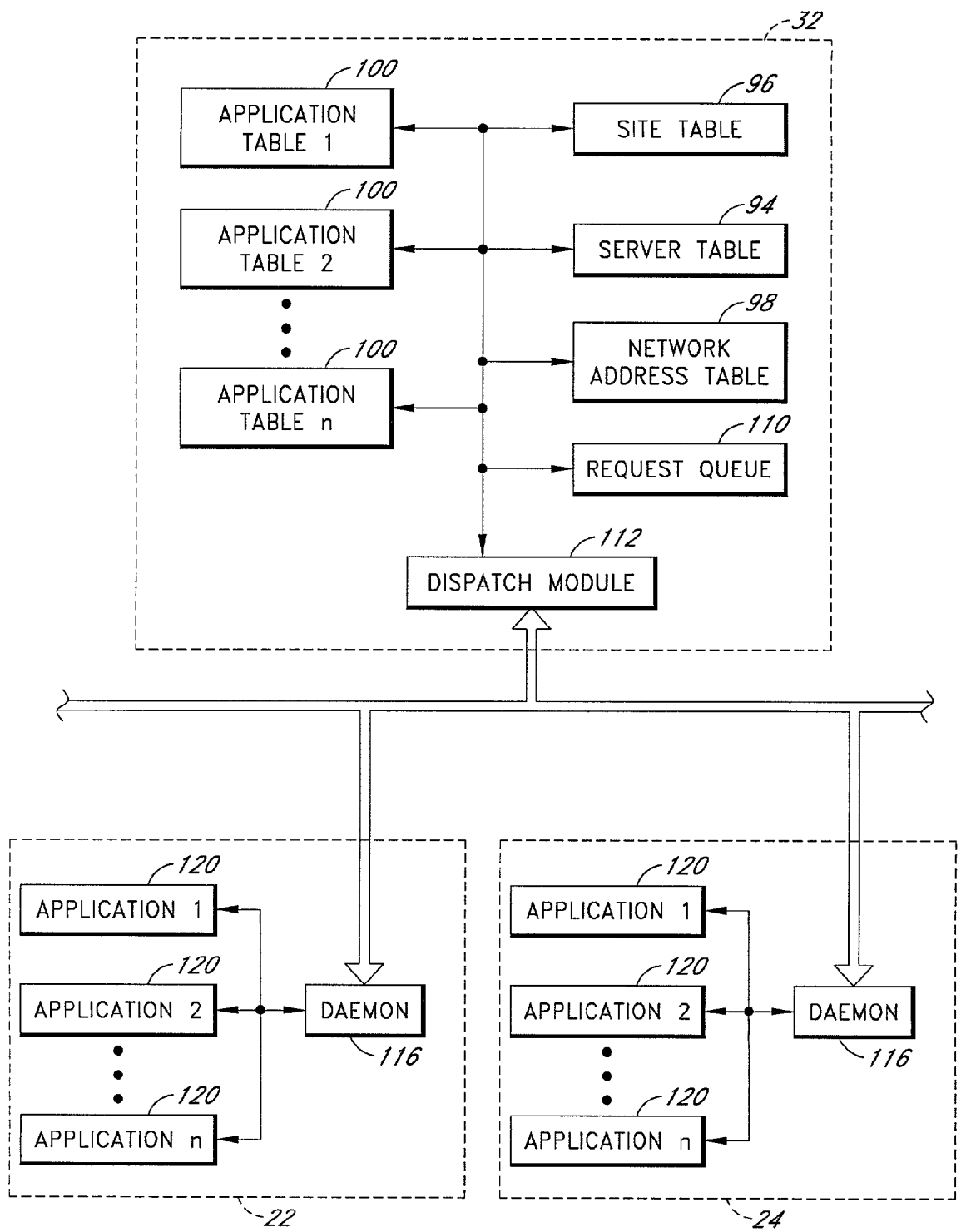
FIG. 7 is a block diagram of a server manager system in accordance with one embodiment of the invention.

FIG. 7 is a block diagram illustrating software modules that reside on the server manager 32 and the servers 22, 24, 26 that the server manager 32 communicates with. As described briefly above, the server manager 32 comprises a database that may advantageously be configured as a plurality of tables containing information about the configuration of the network servers. Although the server configuration information in this specific embodiment is in the form of a plurality of tables, a wide variety of data formats could be used.

As illustrated in FIG. 7, a server table 94 may be provided that contains information about the servers the server manager 32 is designated to communicate configuration parameters to. One embodiment of a server table is illustrated in FIG. 9. Another table 96 includes information about the network resources such as web-sites, email accounts, and the like that are present on the servers. This table may include information about location and properties of all network resources present on the servers. An embodiment of this site table is illustrated in FIG. 10. A network address table 98 contains information about each set of network addresses assigned to respective servers. This table is discussed in additional detail below.

Also advantageously provided are one or more application program tables 100. These tables contain information about the configuration of a selected application program that is running on one or more of the servers 22, 24, 26. For example, a web server table includes information on all web site resources such as server location, capacity, and the like that operate under the control of the web server application program. Similarly, a media server table includes information (such as, for example, maximum allowable number of simultaneously delivered streams) on all network resources that include media delivery capability and that use the media server application program to deliver media content to browsers.

A request queue 110 may be provided that stores requests to add to or modify the information present in the database tables. A FIFO queue may advantageously be utilized, and if desired, the request queue 110 can be configured to suspend modification requests under certain circumstances. For example, requests from a particular user may be suspended because of payment collection issues, for example, or requests which appear to be user errors, such as deleting an entire web site from the servers, can be suspended pending further investigation.

A dispatch module 112 is used to download information to the servers 22, 24, 26 when the tables have been modified or new information is added. The dispatch module triggers a daemon 116 that is resident on each server 22, 24, 26. As described above, the daemon is configured to receive the modified or new parameters from the server manager 32, and to reconfigure the application programs 120 such as web server, media server, etc.

Figure 8:
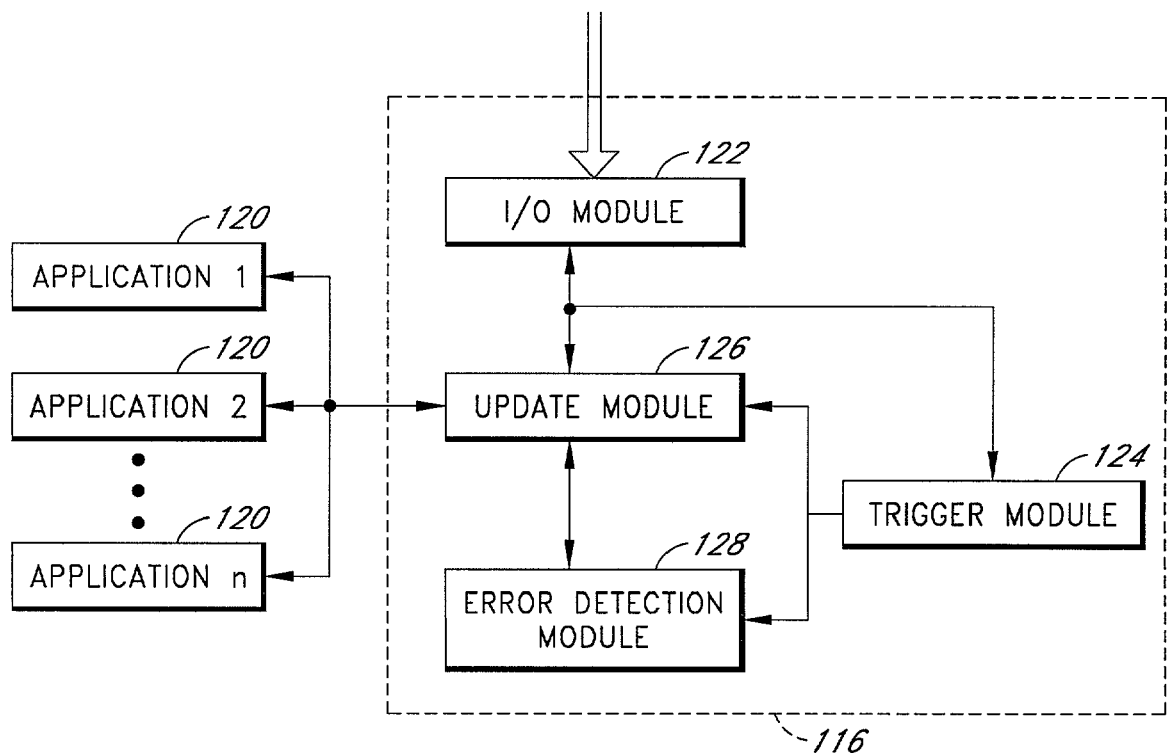
FIG. 8 is a block diagram of the server daemon of FIG. 5.

FIG. 8 illustrates one daemon 116 embodiment in additional detail. In this embodiment, the daemon 116 includes an I/O module 122 for communicating with the server manager 32. Also present is a trigger module 124 which receives a message from the server manager 32 that the server configuration needs to be updated in order to maintain synchronization with the database. Upon receiving this message, the trigger module 124 initiates the operation of an update module 126 and an error detection module 128. The update module receives the configuration data from the server manager 32, and modifies the application programs 120 accordingly. If the application programs accept the re-configuration, the error detection module sends a message to the server manager that the re-configuration has been successful. As described above, if no such message is received by the server manager 32, the database 34 is returned to its original state.

Returning now to the data stored in the database 34, FIGS. 9-12 illustrate specific embodiments of several of the data tables in the embodiment of FIG. 7 described above. It will be appreciated that these embodiments are only specific examples, and that more or fewer table fields could be provided depending on the information required to properly configure the application programs being used and the tracking information that the web hosting service provider would find useful in facility and customer management.

In FIG. 9, one embodiment of a server table 94 is illustrated. In this embodiment, only two fields are provided, an ID field 132 and a description field 134. The ID field comprises a unique name for the machine, and the description field may include a wide variety of information such as operating system, serial number, physical location of the machine, and the like. Of course, the description field 134 could be separated into several fields dedicated to specific server information.

In FIG. 10, one embodiment of a site table 96 is illustrated. This table comprises a comprehensive list of all of the network resources such as web sites that are on the servers controlled by the server manager 32. This table may include a field 140 for a unique site identification number (generally assigned by the web hosting service provider), a field 142 identifying the physical machine/server the site is resident on, a field 144 for storing the user password to access site information and modification tools, and a field 146 for the domain name if applicable.

FIGS. 11 and 12 illustrate application program tables. In FIG. 11, one embodiment of a table for media servers is illustrated. This table may include a field 150 for a site ID for each site having media delivery capacity. The table may also include a server ID field 152, identifying the server the site is located on, the field 154 for the space allocated for the site, and a field 156 for the maximum number of simultaneously deliverable media streams. In FIG. 12, a web server table is illustrated. This table advantageously also includes a field 160 for the site ID, a field 162 for the host server, and a field 164 for allocated space. The table may also include a field 166 for the site IP address. Additional fields 168, 170 for RAM memory and CPU allocation to the web site may be provided in this table.

During the table update process, the server manager 32 may derive or create and then enter the derived information into certain fields without a user specifying the field data. For example, if a user modifies the space allocated to their web site from 10 to 500 MB, the site may need to be moved to another physical server. If this is needed, the server manager 32 may be programmed to select a new server without further user input based on loading or available space considerations. The server selection is then entered into the appropriate table fields.

IP address designation is another example of a configuration parameter that may be performed automatically by the server manager 32. For example, if a new network resource such as a web site is being added by a new or existing customer, or if an existing site is being moved to a new physical server, an IP address must be assigned to the site being created or moved. An IP address is selected by searching the network address table 98 (FIG. 7) for an unused IP address assigned to the server that the network resource is to be resident on.

Figure 13:
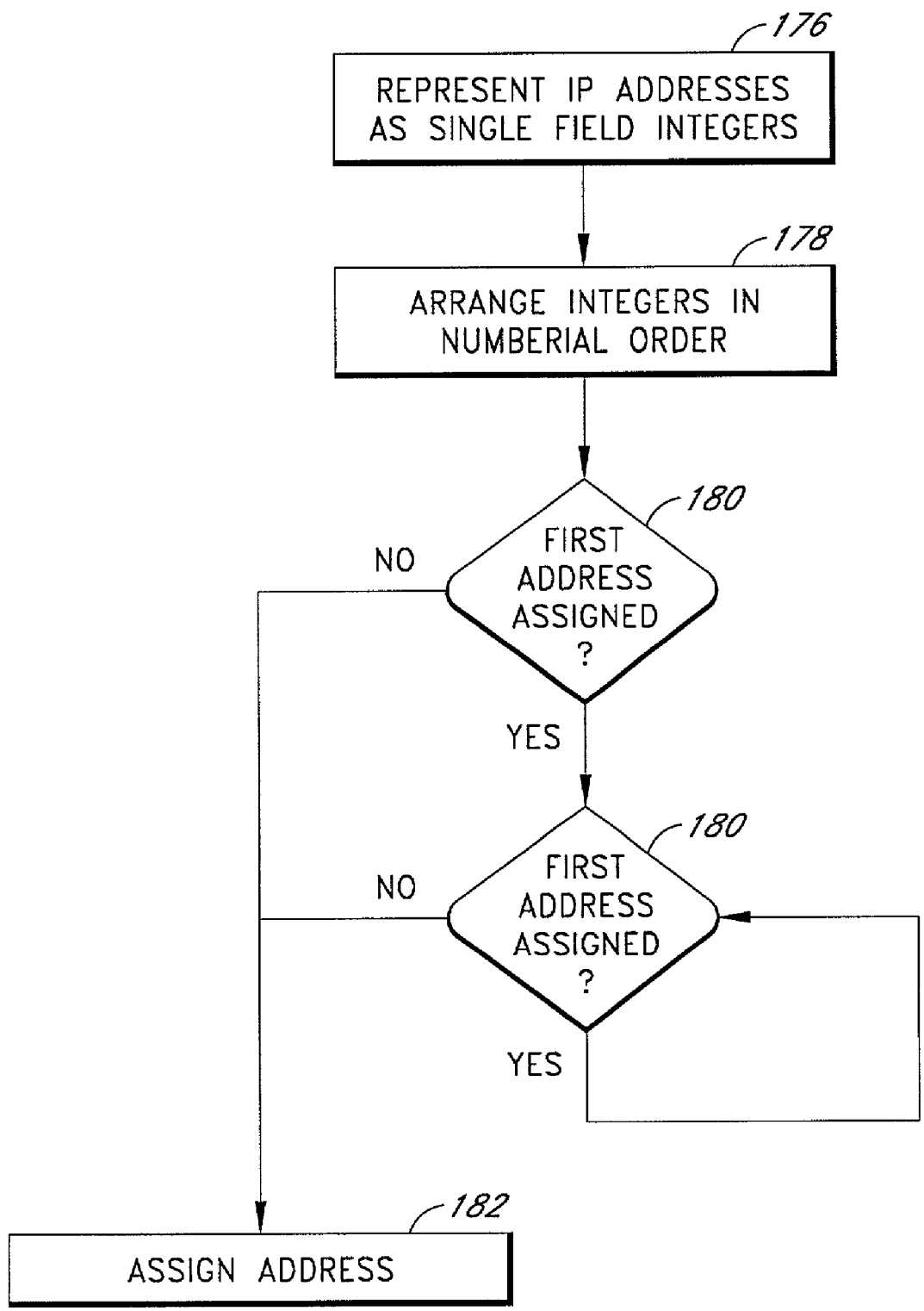
FIG. 13 is a flow chart of a method of assigning network addresses to network resources.

One advantageous embodiment of this process is illustrated in FIG. 13. As shown in this Figure, to facilitate the search for unused IP addresses, at block 176 the normal four field IP address such as the IP address 123.45.255.1, is stored in a single field representation such as 123452551, therefore becoming simply a stored integer. The network address table 98 thus comprises blocks of integers associated with corresponding servers. At block 178, the integers in each block in the table are arranged in ascending or descending numerical order. Integers in the table corresponding to currently used IP addresses are tagged.

When a new IP address needs to be allocated to a network resource, the network address table is searched for an unused IP address. This search is performed quickly using the single field representation because the search algorithm simply starts at the lowest IP address assigned to the relevant server and searches numerically upward until an available address is found. In this embodiment, therefore, the system determines at decision block 180 of FIG. 13 whether or not a first numerically represented IP address is already assigned to a network resource. If it is not, the process moves to block 182 and assigns this address to the new resource. If the first address is assigned, the next numerical IP address is checked at decision block 184. If this address is assigned, the system continues checking the next numerical IP address. Once an unused IP address is identified, the system moves to block 182 and assigns the unused address.

When the next address is to be assigned, the system again starts at the first numerical address at block 180, and again increments numerically until the first available address is identified. This procedure results in fast search times, and guarantees that IP addresses are used efficiently without wasting unused addresses in the middle of the block assigned to a given server that may have become available due to the deletion of a previously supported web site or other network resource.

Thus, utilizing the above described principles, the entire process of modifying server configuration and maintaining synchronization with a database that has the current server configuration stored therein may be performed automatically and without any intervention on the part of a network administrator at the web hosting service provider facility. Control over server configuration is maintained, an accurate centralized database of information for use by the administrator for allocating resources, user billing, and other management functions is provided, while at the same time providing a reduction in labor and cost over conventional server configuration management techniques.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method of synchronizing configuration parameters on a server with a database of stored configuration parameters comprising:

automatically updating at least one application program configuration parameter on the server in response to receiving an update of at least one corresponding stored application configuration parameter in said database, the update initiated by a particular customer of a web hosting provider, wherein each application program configuration parameter defines at least in part a quantity of a resource on the server available to the particular customer of a web hosting provider.

2. The method of claim 1, additionally comprising reversing a database update in the event of an indication of an error during the process of updating the server.

3. The method of claim 1, additionally comprising suspending a database update for a predefined period.

4. The method of claim 1, wherein the quantity of the resource comprises an amount of disk space.

5. The method of claim 1, wherein the quantity of the resource comprises a network address.

6. The method of claim 1, wherein the quantity of the resource comprises an amount of memory space.

7. An information processing system comprising:
at least one network server running at least one application program, wherein application program operation is defined at least in part by a set of configuration parameters stored on said at least one network server and associated with said application program operation;
a database separate from said at least one network server and storing said set of configuration parameters; and
a processor executing instructions to automatically maintain synchronization between said set of configuration parameters stored on said at least one network server and said set of configuration parameters stored in said database, wherein the server is operated by a web hosting provider and wherein each application program configuration parameter defines at least in part a quantity of a resource on the network server available to a particular customer of the web hosting provider.

8. The system of claim 7, wherein the quantity of the resource comprises an amount of communication bandwidth.

9. The system of claim 7, wherein the quantity of the resource comprises an amount of processor capacity.

10. An information processing system comprising:
at least one network server running at least one application program, wherein application program operation is defined at least in part by a set of configuration parameters stored on said at least one network server and associated with said application program operation;
a database separate from said at least one network server and storing said set of configuration parameters; and
a processor executing instructions to automatically maintain synchronization between said set of configuration parameters stored on said at least one network server and said set of configuration parameters stored in said database, wherein each application program configuration parameter defines at least in part a quantity of a resource on the network server that are made available to a particular user of the network server.

11. The system of claim 10, wherein the server is operated by a web hosting provider and each application program configuration parameter defines at least in part a quantity of a resource on the server that is made available to a particular customer of the web hosting provider.

12. The system of claim 10, wherein the quantity of the resource comprises an amount of disk space.

13. The system of claim 10, wherein the quantity of the resource comprises an amount of a network address.

14. The system of claim 10, wherein the quantity of the resource comprises an amount of memory space.

15. The system of claim 10, wherein the quantity of the resource comprises an amount of communication bandwidth.

16. The system of claim 10, wherein the quantity of the resource comprises an amount of processor capacity.

17. A method of synchronizing configuration parameters on a server with a database of stored configuration parameters that is separate from the network server, the method comprising:
automatically updating an application program configuration parameter on the server in response to an update of a corresponding stored application configuration parameter in said database by a particular user of the server,
wherein the application program configuration parameter defines a quantity of a resource on the server that is available to the particular user of the server.

18. The system of claim 17, wherein the server is operated by a web hosting provider and the quantity of the resource is made available to a particular customer of the web hosting provider.

19. The system of claim 17, wherein the resource comprises at least one of disk space, a network address, memory space, communication bandwidth, or processor capacity.

20. The system of claim 17, wherein the automatically updating further comprises:
updating the corresponding stored application configuration parameter in said database in response to a request from the particular user;
triggering a daemon to run on the server, wherein the triggering is responsive to the updating the corresponding stored application configuration parameter in said database.

21. The system of claim 17, wherein the automatically updating further comprises:
receiving a request, from the particular user, for an update to the corresponding stored application configuration parameter in said database;
updating the corresponding stored application configuration parameter in said database, responsive to the receiving;
triggering a daemon to run on the server, wherein the triggering is responsive to the updating the corresponding stored application configuration parameter in said database.

22. The system of claim 17, wherein the automatically updating further comprises:
receiving a selection, from the particular user, of the corresponding stored application configuration parameter in said database, from one of a plurality of stored application configuration parameters;
receiving a request, from the particular user, for an update to the selected corresponding stored application configuration parameter in said database;
updating the selected corresponding stored application configuration parameter in said database, responsive to the receiving;
triggering a daemon to run on the server, wherein the triggering is responsive to the updating the selected corresponding stored application configuration parameter in said database.

* * * * *

UNITED STATES PATENT AND TRADEMARK OFFICE
CERTIFICATE OF CORRECTION

PATENT NO. : 8,370,470 B2  
APPLICATION NO. : 09/766473  
DATED : February 5, 2013  
INVENTOR(S) : Kim et al.

Page 1 of 1

It is certified that error appears in the above-identified patent and that said Letters Patent is hereby corrected as shown below:

In the Claims

Column 12, line 18, Claim 18, replace "system" with -- method --

Column 12, line 22, Claim 19, replace "system" with -- method --

Column 12, line 25, Claim 20, replace "system" with -- method --

Column 12, line 34, Claim 21, replace "system" with -- method --

Column 12, line 46, Claim 22, replace "system" with -- method --

Signed and Sealed this  
Eighteenth Day of February, 2014

Michelle K. Lee  
*Deputy Director of the United States Patent and Trademark Office*